United States Patent [19]

Francis

[11] 3,719,756

[45] March 6, 1973

[54] COMPOSITIONS FOR INHIBITING ANOMALOUS DEPOSITION AND MOBILIZATION OF CALCIUM PHOSPHATE IN ANIMAL TISSUE

[75] Inventor: Marion D. Francis, Springfield Township, Hamilton County, Ohio

[73] Assignee: The Proctor & Gamble Company, Cincinnati, Ohio

[22] Filed: Oct. 30, 1970

[21] Appl. No.: 85,803

[52] U.S. Cl. ........................................ 424/204, 99/2
[51] Int. Cl. ............................................. A61r 27/00

[58] Field of Search ................. 424/204; 260/502.4 P

Primary Examiner—Richard L. Huff
Attorney—Jack D. Schaeffer and Richard C. Witte

[57] ABSTRACT

Compositions for inhibiting anomalous deposition and mobilization of calcium phosphates in animal tissue, comprising an effective amount of a poly(vinylidenediphosphonate) in a pharmaceutical carrier; and a method for treating conditions involving pathological calcification and hard tissue demineralization in an animal comprising administering to such animal said compositions.

6 Claims, No Drawings

COMPOSITIONS FOR INHIBITING ANOMALOUS DEPOSITION AND MOBILIZATION OF CALCIUM PHOSPHATE IN ANIMAL TISSUE

BACKGROUND OF THE INVENTION

This invention relates to novel compositions having therapeutic and/or prophylactic effects. The invention further relates to a novel method for treating or preventing certain pathological conditions in animals.

A number of pathological conditions which can afflict warm-blooded animals involve abnormal calcium and phosphate metabolism. Such conditions may be divided into two broad categories:

1. Conditions which are characterized by anomalous mobilization of calcium and phosphate leading to general or specific bone loss or excessively high calcium and phosphate levels in the fluids of the body. Such conditions are sometimes referred to herein as pathological hard tissue demineralizations.

2. Conditions which cause or result from deposition of calcium and phosphate anomalously in the body. These conditions are sometimes referred to herein as pathological calcifications.

The first category includes osteoporosis, a condition in which bone hard tissue is lost disporportionately to the development of new hard tissue. Marrow and blood spaces become larger, fibrous binding decreases and compact bone becomes cancellous and fragile. Osteoporosis can be subclassified as menopausal, senile, drug induced (e.g., adrenocorticoid as can occur in steroid therapy), disease induced (e.g., arthritic and tumor), etc.; however, the manifestations are essentially the same. Another condition in the first category is Paget's disease (osteitis deformans) which is also characterized by bone loss. In this disease, dissolution of normal bone occurs which is then replaced by soft, poorly mineralized tissue such that the bone becomes deformed from pressures of weight bearing, particularly in the tibia and femur. This condition also frequently sponsors pathological deposition of calcium and phosphate.

The second category, involving conditions manifested by anomalous calcium and phosphate deposition, includes such afflictions as arthritis, neuritis, bursitis, tendinitis and other inflammatory conditions which predispose involved tissue to deposition of calcium phosphates, and hormonal imbalance, e.g., hyperparathyroidism, myositis ossificans progressiva, calcinosis universalis, resulting in calcification of soft tissues. Atherosclerosis is another condition in this category and involves degeneration and proliferate change in the intima which produces fibrous, lipoid plaques. If such plaques calcify, or if the inner walls of the arteries accumulate plaque and calcify, this condition is commonly referred to as arteriosclerosis.

Yet another condition in category (2) which results from anomalous calcium and phosphate deposition is stone or calculi formation in the bile duct, gall bladder, pancreas, salivary glands, tonsils, kidneys and bladder. Although some of such stones are not comprised primarily of calcium phosphate, it is likely that the original nidus is calcium phosphate. The formation of urinary calculi, i.e., urolithiasis, in cattle and sheep constitutes a major problem in veterinary medicine. It is estimated that from 5 to 10 percent of weanling calves suffer this affliction when they are taken off milk and start taking in other fluids.

As far as is known, no entirely satisfactory medical treatment for the conditions of category (1) as described above has been developed prior to this invention although dietary control, fluorides, chelators such as EDTA, and the hormone calcitonin (thyrocalcitonin) have been suggested or used for these conditions. Although certain inorganic phosphates such as pyrophosphates and longer chain condensed phosphates have been suggested for treatment of conditions in category (2), they have not been widely used because of their tendency to hydrolyze to the ineffective orthophosphate when administered to larger animals such as humans and cattle.

Various organic polyphosphonates have been shown to be effective in inhibiting anomalous deposition and mobilization of calcium phosphate as is disclosed in U.S. Pat. No. 3,683,080; however, researchers continue to seek effective alternatives.

It is therefore an object of this invention to provide a composition for inhibiting anomalous deposition and mobilization of calcium phosphate in animal tissue.

It is a further object of this invention to provide an alternate method for treatment of conditions involving pathological calcification and hard tissue demineralization in animals.

SUMMARY OF THE INVENTION

This invention is based on the discovery that poly(vinyl-idenediphosphonates) (as hereinafter defined) effectively inhibit the crystallization of the most common form of calcium phosphate found in animals, calcium hydroxylapatite. The invention thus involves a composition and method for treating conditions involving pathological demineralization of bony tissue and pathological calcium deposition in the soft tissue of animals. In its method aspect, the invention comprises administering to said animal an effective amount of a poly(vinylidenediphosphonate) as hereinafter characterized.

DETAILED DESCRIPTION OF THE INVENTION

In one of its aspects, this invention is a composition comprising an effective but non-toxic amount of poly(vinylidenediphosphonic) acid having the structural formula:

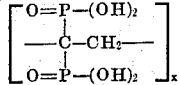

wherein $x$ is an integer from about 3 to about 5000, preferably about 10 to about 500, or a pharmaceutically acceptable salt thereof wherein one, or more, of the acidic protons are replaced by cations, likewise as hereinafter detailed, and a pharmaceutical carrier.

Poly(vinylidenediphosphonic) acid can be prepared by any suitable method, however, an especially preferred method is disclosed by Berry and Lyness in the co-pending application, Ser. No. 717,419, filed Mar. 29, 1968, (now abandoned). The poly(vinylidenediphosphonic) acid can be converted to the salt form by adding an aqueous basic solution of a pharmaceutically acceptable cation thereto. Among the pharmaceutically acceptable poly(vinylidenediphosphonate) salts useful herein are to alkali metal salts (e.g., sodium and potassium); alkaline earth metal salts (e.g., calcium and magnesium); non-toxic heavy metal salts (e.g., stannous and idium); ammonium salts; and low molecular weight substituted ammonium salts (e.g., mono-, di-, and triethanolammonium). Mixtures of the acid and salt forms also serve the purposes of this invention. Poly(vinylidenediphosphonic) acid, its salts, and mixtures of said acid and salts, are all herein referred to generically as "poly(vinylidenediphosphonates)."

It will be recognized that each monomer unit of the acid contains 4 protons capable of being replaced by cations. When a divalent cation, e.g., stannous ion, is used to prepare the salts of poly(vinylidenediphosphonic) acid, the resulting salt will contain an average of one (half neutralization) or two (full neutralization) stannous ions per monomer unit. When monovalent cations, e.g., sodium ion, are used, the resulting salt can contain an average of one, two, three or four sodium ions per monomer unit, depending on the degree of neutralization. Any of these salts are useful herein, but the trisodium salt of poly(vinylidenediphosphonic) acid is especially preferred for use in the practice of this invention.

The poly(vinylidenediphosphonates) have a range of molecular weights. The compounds useful herein are of the same molecular weight range as those of Berry and Lyness, above.

The required dosage of poly(vinylidenediphosphonate) acid or salt will vary with the particular condition being treated, the severity of the condition, and the duration of treatment; however, single dosages can range from 0.01 to 500 mg. per kilogram of body weight, preferably 0.1 to 50 mg./kg., with up to four dosages daily. The higher dosages within this range are, of course, required in the case of oral administration because of limited absorption. Dosages greater than about 500 mg./kg. may produce toxic symptoms and should be avoided. Moreover, daily dosages greater than about 2000 mg./kg. (unless otherwise specified, the unit designated "mg./kg." as used herein refers to mg. of compound/kg. of body weight) are not required to produce the desired effect and may produce toxic side effects. Dosages of less than about .001 mg./kg. do not materially affect pathological calcification or demineralization, even when administered intravenously. Table I below sets forth preferred dosages for various conditions which can be treated in accordance with this invention.

TABLE 1

| Condition | Oral Dosage (mg./kg.) Up to Four Times/Day |
|---|---|
| Osteoporosis (menopausal)* | 1 – 25 |
| Osteoporosis (senile, etc.) | 1 – 25 |
| Paget's Disease | 5 – 50 |
| Arthritis | 1 – 25 |
| Bursitis | 1 – 25 |
| Neuritis | 1 – 25 |
| Stones | 1 – 25 |

* A larger initial dosage may be required, e.g., up to 500 mg./kg. followed by the specific dosage level.

The poly(vinylidenediphosphonates) can also be administered parenterally in aqueous solution by subcutaneous, intradermal, intramuscular, intraperitoneal, or intravenous injection. The preferred single dosage ranges by these modes of administration are as follows:

| | |
|---|---|
| Subcutaneous | 0.1 – 10 mg./kg. |
| Intradermal | 0.1 – 10 mg./kg. |
| Intramuscular | 0.05 – 5 mg./kg. |
| Intravenous | 0.05 – 5 mg./kg. |
| Intraperitoneal | 0.05 – 5 mg./kg. |

For purposes of oral administration the poly(vinylidenediphosphonates) can be formulated in the form of capsules, tablets or granules. For treatment of non-human animals, the poly(vinylidenediphosphonates) are preferably incorporated in animal feed, feed supplements or feed concentrates. They can also be prepared in unit dosage form together with a pharmaceutical carrier, each unit dosage form containing from 15 mg. to 10 g. of poly(vinylidenediphosphonate). The preferred concentration range of poly(vinylidenediphosphonate) in unit dosage forms intended for use by humans and smaller domesticated animals is from 15 mg. to 1000 mg., more preferably 100 mg. to 500 mg. A higher concentration range, i.e., from 1 g. to 5 g., is preferred in unit dosage forms intended for treatment of larger animals such as cattle, horses, etc.

When administered orally, the compositions of this invention are preferably in a form adapted to minimal exposure of the poly(vinylidenediphosphonates) to the oral cavity. Although these compounds do not damage dental enamel when applied to tooth surfaces at relatively low concentrations, the moderately high concentrations of poly(vinylidenediphosphonates) provided in the unit dosage form embodiments of this invention may demineralize dental enamel by a chelation effect on repeated, prolonged exposure. Thus, oral administration is preferably effected with such unit dosage forms as capsules, pills and tablets which are promptly ingested. Troches, chewable tablets and the like, which typically remain in the oral cavity for a substantial time prior to ingestion, are preferably avoided.

As used herein, the term "pharmaceutical carrier" denotes a solid or liquid filler, diluent of encapsulating substance. Some examples of the substances which can serve as pharmaceutical carriers are sugars such as lactose, glucose and sucrose; starches such as corn starch and potato starch; cellulose and its derivatives, such as sodium carboxymethylcellulose, ethylcellulose, cellulose acetate; powdered tragacanth; malt; gelatin; talc; stearic acid; magnesium stearate; calcium sulfate; vegetable oils, such a peanut oil, cottonseed oil, sesame oil, olive oil, corn oil and oil of theobroma; polyols such as propylene glycol, glycerin, sorbitol, mannitol, and polyethylene glycol; agar; alginic acid; pyrogen-free water; isotonic saline; and phosphate buffer solutions, as well as other non-toxic compatible substances used in pharmaceutical formulations. Wetting agents and lubricants such as sodium lauryl sulfate, as well as coloring agents, flavoring agents and preservatives, can also be present.

The pharmaceutical carrier employed ,n conjunction with the poly(vinylidenediphosphonates) is used at a concentration sufficient to provide a practical size-to-dosage relationship. Preferably, the pharmaceutical carrier comprises from about 0.1% to 99% by weight of the total composition.

Animal feed compositions to which the poly(vinylidenediphosphonates) can be added generally include as feedstuffs a cellulosic roughage component such as hay, straw, cottonseed hulls, beet pulp, silage, ground corn cobs, corn stalks, etc. Protein-containing components such as whole grains, including corn, wheat, barley, oats, rye, millet and alfalfa; processed grains, including cottonseed meal, corn meal, soybean meal, linseed meal and other waste products from the oil expressing industry; animal protein including casein, gelatin, fish meal, and slaughterhouse wastes, are also required feedstuffs for a nutritionally balanced feed composition. Animal feed compositions can also contain natural oils, including animal fats, such as feed tallow, mutton tallow; fish oils, including eel, herring, menhaden, tuna and salmon oil; and whale oil. Vegetable oils such as soybean oil, sunflower oil, olive oil, safflower oil, corn oil, peanut oil, cotton-seed oil, rice oil, millet oil, wheat germ oil and palm oil, can also be used.

In addition to the feedstuffs mentioned above, animal feed compositions can include supplemental sources of minerals, such as bone meal, salt and the various trace minerals, such as salts of zinc, copper, manganese, magnesium, cobalt, iodine and iron. Antibiotics, steroids, anthelmintics and other medicants or growth stimulating substances can be incorporated in animal feeds. Various vitamins can be added to animal feed compositions to provide for deficiencies incident to the selection of other feed components. Other feedstuffs can be included such as casein, other milk by-products and synthetic nitrogen sources such as urea.

The poly(vinylidenediphosphonates) can be incorporated in the total feed composition as described above or in intermediate feed concentrates or feed supplements which are adapted to be blended with the basic roughage and protein feedstuffs to prepare the final feed. In the feed industry the term "concentrate" is often used to denote a product which contains a relatively large quantity of one or more nutrients, such as high quality protein, minerals, vitamins and the like and which is adapted for addition to the basic feedstuffs to form a total or final feed. The term "supplement" is also used to denote a specific feedstuff or mixture thereof that is either added to, or included in, the concentrate portion of the total feed, or in the total feed itself. The poly(vinylidenediphosphonates) can be employed in accordance with this invention by incorporating same in feed supplements, concentrates or the total feed composition (all referred to hereinafter as "feed compositions"). For the purposes of this invention, the term "pharmaceutical carrier" is intended to encompass feed compositions.

Feed compositions containing a minor proportion of one or more of the poly(vinylidenediphosphonates) described herein incorporated in a major proportion of an animal foodstuff constitute a preferred embodiment of this invention inasmuch as they provide an effective and practical means of urolithiasis prophylaxis for large herds of animals, especially during periods of feed-lot maintenance or limited grazing. Urolithiasis prophylaxis can be achieved in grazing herds by incorporating the poly(vinylidenediphosphonates) in block salt.

The concentration of poly(vinylidenediphosphonates) in feed compositions will of course vary with the weight of the animal to be treated and the proportion of the total diet which the feed composition comprises. When herds of animals are to be treated, the level of poly(vinylidenediphosphonate) in the feed composition should be sufficient to provide the dosage specified herein based on the average feed consumption and weight of the animals. In any event, the poly(vinylidenediphosphonates) comprise a minor proportion of the total feed composition.

While it is not intended that this invention be limited by a particular theory of operation, in the case of those conditions which cause or result from deposition of calcium and phosphate anomalously in the body, it is believed that the poly(vinylidenediphosphonates) interfere with the conversion of x-ray amorphous calcium phosphate to crystalline calcium hydroxylapatite and thus greatly reduce or prevent the formation of calcium phosphate deposits. Although certain inorganic phosphates also inhibit crystal growth, they are hydrolyzed soon after administration to the orthophosphate species which has no crystal growth inhibition properties and, in fact, can itself take part in hydroxylapatite formation. The poly(vinylidenediphosphonates) of this invention, on the other hand, do not hydrolyze to inactive forms and remain active after administration even to larger animals such as cattle.

PREPARATION OF THE POLY(VINYLIDENEDIPHOSPHONATES)

The following examples demonstrate the synthesis of poly(vinylidenediphosphonic) acid and salts thereof. While other methods of synthesis may be obvious to those skilled in the art, the following synthesis procedures are offered by way of illustration. Specific examples directed to therapeutic compositions containing the poly(vinylidenediphosphonate) compounds will be given later in the specification.

EXAMPLE I

According to the process of Berry and Lyness, above, the carbanion of the isopropyl ester of methylenediphosphonic acid (MDP), prepared according to U.S. Pat. No. 3,251,907, was prepared by the slow, drop-wise addition of 120.5 grams (0.352 mole) of isopropyl MDP ester to a stirred slurry of 15.7 grams of 53.4percent sodium hydride (0.349 mole) in 350 milliliters of dry benzene. The stirred mixture was cooled as necessary to prevent the temperature from exceeding 40° C. When the addition was complete and the solution was nearly clear, 122 grams of methylene bromide (0.702 mole) was added and the mixture was allowed to stand and react at room temperature for about 120 hours at which time it was neutral. Sodium bromide, a by-product of the reaction, was removed by filtration and the benzene was removed by evaporation. The residue was dissolved in diethyl ether and washed four times to remove residual sodium bromide. The ether solution was dried over anhydrous magnesium sulfate and the ether was removed by evaporation. The residue was a colorless, rather viscous liquid. It was placed in a wide-bore distillation apparatus and distilled at 12–25 $\mu$ pressure up to a pot temperature of 155° C. Excess unreacted MDP isopropyl ester was removed by this distillation means. The viscous residue is 17.4percent P and 1.4percent Br on analysis. Theoretical for the isopropyl ester form of poly(vinylidenediphosphonate) is 17.3percent P. $P^{31}$NMR shows a single peak at $-21.4$ p.p.m. ($H_3PO_4$ ref.). Proton NMR (In $D_2O$ solution) shows a methyl doublet at 8.62T and methinyl multiplet at 5.20T from the isopropyl groups.

Seventy-five grams of the viscous residue was dissolved in about 300 milliliters of medium weight mineral oil containing enough carbon tetrachloride to give a solution. The solution was added drop-wise to a flask equipped with a stirrer, a nitrogen inlet, and a dropping funnel. The flask was immersed in a silicon bath heated to 200°–210° C. Pyrolysis, evidenced by rapid evolution of propylene, was rapid. After the addition was complete, the mixture was heated an additional half hour, with stirring under nitrogen. The product was separated by aqueous extraction and the aqueous extracts were decolorized with Nuchar. The poly(vinylidenediphosphonic) acid was recovered by freeze-drying the aqueous filtrate. Thirty-five grams of the acid were recovered. This was dissolved in water and adjusted to pH 10 using 25 percent (by weight) aqueous sodium hydroxide. The sodium salt was recovered by freeze-drying. The sodium salt of poly(vinylidenediphosphonic) acid was predominantly the trisodium salt and had a molecular weight of from about 1,000 to about 15,000.

The above synthesis procedure is repeated with the following change: the isopropyl ester of poly(vinylidenediphosphonic) acid is converted to the poylacid by hydrolysis rather than pyrolysis. 20.8 grams of poly(tetraisopropyl vinylidenedisphosphonate) is dissolved in 250 milliliters of concentrated hydrochloric acid and the mixture is refluxed 8 hours. After standing overnight, the mixture is concentrated in vacuo to give a light, straw-colored viscous liquid. The residual HCl is removed by redissolving in water and redrying in vacuo. The thoroughly dried poly(tetraisopropyl vinylidenediphosphonic) acid is a friable solid which is converted to a salt by neutralizing with the pharmaceutically acceptable base, potassium hydroxide. The polymerized salt form has a molecular weight in the range of 1,000 to about 15,000 and is identical to the salt prepared by pyrolysis (above).

The poly(vinylidenediphosphonic) acid, prepared as above, is divided into several portions. Appropriate amounts of aqueous, basic solutions of sodium ion, potassium ion, magnesium ion, calcium ion, diethanolamine, triethanolamine, stannous ion and ammonium ion are added to the individual portions and the monosodium, disodium, dipotassium distannous, tetraammonium, tetrakis-(triethanolammonium), dipotassium-disodium, diammonium, tripotassium, dicalcium, monocalcium-disodium, monocalcium-ammonium, bis-(triethanolammonium), tetrakis-(diethanolammonium), and dimagnesium salts are prepared.

CRYSTAL GROWTH INHIBITION DETERMINATION

The efficacy of the poly(vinylidenediphosphonates) in inhibiting crystal growth was demonstrated by the Crystal Growth Inhibition Determination which was conducted as follows:

1 ml. of a 0.1 M stock solution of $NaH_2PO_4 \cdot H_2O$ was diluted with 18 ml. of distilled water. 5 ml. of an aqueous solution of trisodium poly(vinylidenediphosphonate), prepared in accordance with Example I, at a concentration sufficient to provide the desired ultimate concentration in the reaction mixture was added to the diluted $NaH_2PO_4$ solution and the solution was adjusted to pH 7.4 with sodium hydroxide. To this solution was added 1 ml. of a 0.1 M solution of $CaCl_2 \cdot 2H_2O$ pre-adjusted to pH 7.4 with sodium hydroxide. This mixture was held at a constant pH 7.4 throughout the reaction period.

After a sufficient reaction time as determined by the operator, generally within 90 minutes, the solution was filtered through a 0.45 Millipore filter pad. The precipitate was air-dried and analyzed by x-ray diffraction. The solid calcium phosphate precipitated from the above-described solution without the trisodium poly(vinylidenediphosphonate) gives a typical hydroxylapatite pattern, while the calcium phosphate precipitated under the same conditions but in the presence of small amounts of this representative poly(vinylidenediphosphonate) is amorphous to x-rays.

Those compounds which are effective in inhibiting the growth of hydroxylapatite crystals at concentrations of less than $1.5 \times 10^{-3}$ molar diphosphonate under the conditions of this test are found to inhibit anomalous mobilization and deposition of calcium phosphates in animal tissue, while several compounds outside the scope of this invention that have little or no effect in this test are ineffective in vivo.

When tested in the above-described manner the trisodium poly(vinylidenediphosphonate) was found to inhibit crystal growth at a concentration $5 \times 10^{-4}$ molar diphosphonate. Similar values are obtained when the other poly(vinylidenediphosphonates) encompassed by this invention are tested in like manner.

The following examples are offered to show therapeutic compositions containing the various poly(vinylidenediphosphonates) and are not intended to limit the scope of the invention. The poly(vinylidenediphosphonates) used in the compositions of Examples II through XI are prepared in accordance with Example I.

EXAMPLE II

Capsules are prepared by conventional methods, comprised as follows:

| Ingredient | mg per capsule |
|---|---|
| Trisodium poly(vinylidenediphosphonate) | 700.00 |
| Starch | 55.60 |
| Sodium lauryl sulfate | 2.90 |

The above capsules administered orally twice daily substantially reduce bone decalcification in a patient weighing approximately 70 kilograms afflicted with osteoporosis. Similar results are attained when the tetrapotassium salt, the dimagnesium salt, the monocalcium-disodium salt, and the tetraammonium salt, respectively, are employed in the above described capsule in place of the trisodium salt.

EXAMPLE III

Tablets are prepared by conventional methods, formulated as follows:

| Ingredient | mg per tablet |
|---|---|
| Disodium-dipotassium poly(vinylidenediphosphonate) | 250.00 |
| Lactose | 40.00 |
| Starch | 2.50 |
| Magnesium stearate | 1.00 |

When administered orally four times daily, the above composition significantly reduces the formation of renal calculi in a patient weighing approximately 50 kilograms, having a predisposition to such formation.

Similar results are achieved with tablets formulated as above but replacing disodium-dipotassium poly(vinylidenediphosphonate) with tetrakis-(triethanolammonium) poly(vinylidenediphosphonate), distannous poly(vinylidenediphosphonate), monosodium poly(vinylidenediphosphonate), monocalcium-ammonium poly(vinylidenediphosphonate) and poly(vinylidenediphosphonic) acid, respectively.

The lactose employed in this example is replaced by sucrose and the magnesium stearate by sodium carboxylmethyl-cellulose without affecting the desired properties of the tablet.

Solutions for parenteral administration are prepared by dissolving the following poly(vinylidenediphosphonates) in distilled water at the specified concentration, adjusting Examples IV, VI and VIII to pH 7.4 with HCl and adjusting Examples V, VII and IX with the base corresponding to the indicated salt form, or sodium hydroxide in the case of the acids, and sterilizing same by standard techniques.

| Ex. | Phosphonate | Conc. mg./ml. |
|---|---|---|
| IV | Disodium salt of poly(vinylidenediphosphonic) acid | 10.0 |
| V | Tripotassium poly(vinylidenediphosphonate) | 15.0 |
| VI | Diammonium salt of poly(vinylidenediphosphonic) acid | 5.0 |
| VII | Bis-(triethanolammonium) poly(vinylidenediphosphonic) acid | 25.0 |
| VIII | Tetrakis-(diethanolammonium) poly(vinylidenediphosphonate) | 13.0 |
| IX | Poly(vinylidenediphosphonic) acid | 18.0 |

The solutions of the foregoing examples when administered by injection to animals in an amount sufficient to provide recommended dosage levels as hereinbefore specified substantially reduce pathological calcification and hard tissue demineralization. Preferably, the solutions are packaged in 2 ml. sealed ampules for single dosage hypodermic injections.

EXAMPLE X

A complete feed composition embodying the present invention is prepared by grinding and mixing the following:

| Component | Parts by Weight |
|---|---|
| Timothy hay | 960 |
| Dehydrated alfalfa | 40 |
| Yellow corn | 600 |
| Corn starch | 310 |
| Iodized salt | 10 |
| Bone meal | 20 |
| Sea salt | 1.3 |
| Soybean meal | 30 |
| Biuret | 28 |
| Trisodium poly(vinylidenediphosphonate) | 0.70 |

This composition is fed to 400 pound weanling steers at a rate of approximately 12 pounds per day. The average dosage of poly(vinylidenediphosphonate) effected in this manner is about 1.91 g. per day (10.5 mg./kg. dose). Animals placed on this feed experience a substantially lower incidence of urolithiasis than control animals receiving the same feed but without the poly(vinylidenediphosphonate).

EXAMPLE XI

A supplementary feed concentrate is prepared by intimately admixing the following:

| Component | Parts by Weight |
|---|---|
| Biuret | 400 |
| Brewer's dried grains | 33 |
| Dehydrated alfalfa | 53 |
| Iodized salt | 10 |
| Tricalcium phosphate | 2.4 |
| Poly(vinylidenediphosphonic) acid | 1.6 |

This composition is suitable for mixing with silage, grain, hay, ground grain and the like for preparing total feed compositions for ruminant livestock. When fed as a supplement to legumes consumed by grazing weanling lambs at the rate of 0.25 pounds per day, the average dosage for a 40 pound lamb is 0.363 g. per day (or 20 mg./kg.). This supplement greatly reduces the incidence of urolithisasis.

What is claimed is:

1. A composition in unit dosage form for inhibiting anomalous deposition and mobilization of calcium phosphate in animal tissue comprising (1) an effective but non-toxic amount, within the range from about 15 mg. to about 1000 mg. of a polyphosphonate selected from the group consisting of poly(vinylidenediphosphonic) acid composed of monomer units of the formula

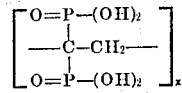

wherein x is an integer from about 3 to about 5000 and the pharmaceutically acceptable salts thereof; and (2) a pharmaceutical carrier.

2. The composition of claim 1 in which the polyphosphonate is trisodium poly(vinylidenediphosphonate).

3. A method for inhibiting anomalous deposition and mobilization of calcium phosphate in animal tissue comprising systemically administering to said animals an effective but non-toxic amount of a polyphosphonate selected from the group consisting of poly(vinylidenediphosphonic) acid composed of monomer units of the formula

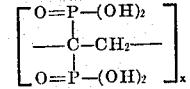

wherein x is an integer from about 3 to about 5000 and the pharmaceutically acceptable salts thereof.

4. The method of claim 3 wherein the polyphosphonate is trisodium poly(vinylidenediphosphonate).

5. An animal feed composition comprising a minor proportion of a polyphosphonate selected from the group consisting of poly(vinylidenediphosphonic acid) composed of monomer units of the formula

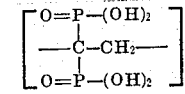

wherein x is an integer from about 3 to about 5000 and the pharmaceutically acceptable salts thereof and a major proportion of an animal food stuff.

6. A composition of claim 5 wherein the polyphosphonate is trisodium poly(vinylidenediphosphonate).

* * * * *